(12) United States Patent
Hao et al.

(10) Patent No.: US 10,133,911 B2
(45) Date of Patent: Nov. 20, 2018

(54) METHOD AND DEVICE FOR VERIFYING FINGERPRINT

(71) Applicant: Beijing Xiaomi Mobile Software Co., Ltd., Haidian District, Beijing (CN)

(72) Inventors: Ning Hao, Beijing (CN); Yanteng Wang, Beijing (CN); Huanhuan Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 27 days.

(21) Appl. No.: 15/444,638

(22) Filed: Feb. 28, 2017

(65) Prior Publication Data
US 2017/0249497 A1    Aug. 31, 2017

(30) Foreign Application Priority Data

Feb. 29, 2016   (CN) .......................... 2016 1 0112807

(51) Int. Cl.
*G06K 9/00*    (2006.01)
*G06F 21/32*   (2013.01)
*G06K 9/68*    (2006.01)

(52) U.S. Cl.
CPC ......... *G06K 9/00087* (2013.01); *G06F 21/32* (2013.01); *G06K 9/00006* (2013.01); *G06K 9/0012* (2013.01); *G06K 9/00013* (2013.01); *G06K 9/68* (2013.01)

(58) Field of Classification Search
CPC ........... G06K 9/00073; G06K 9/00892; G06K 9/036; G06K 2009/00932

USPC ................ 382/115, 116, 124, 125, 209, 278; 340/5.52, 5.53, 5.81, 5.82, 5.83

See application file for complete search history.

(56) References Cited

U.S. PATENT DOCUMENTS 5,828,773 A * 10/1998 Setlak .................. G06K 9/0002
382/126
5,852,670 A * 12/1998 Setlak .................. G06K 9/0002
382/126

(Continued)

FOREIGN PATENT DOCUMENTS

CN       104751038 A     7/2015
CN       105069343 A     11/2015

(Continued)

OTHER PUBLICATIONS

International Search Report in international application No. PCT/CN2016/101861, dated Jan. 18, 2017, 5 pages.

(Continued)

*Primary Examiner* — Yosef Kassa
(74) *Attorney, Agent, or Firm* — Arch & Lake LLP

(57) ABSTRACT

Methods and devices are provided for verifying a fingerprint in the field of computer technology. The method includes: N pressing operations successively performed by a finger of a user within an area for acquiring the fingerprint are acquired; a sequence of fingerprints to be verified is generated according to fingerprints and pressing intensities of the N pressing operations; the sequence of fingerprints to be verified is compared with a reference sequence of fingerprints; and when the sequence of fingerprints to be verified is the same as the reference sequence of fingerprints, it is determined that the fingerprint of the user is successfully verified.

17 Claims, 5 Drawing Sheets

(56) References Cited

U.S. PATENT DOCUMENTS

| | | | | |
|---|---|---|---|---|
| 6,072,895 | A * | 6/2000 | Bolle | G06K 9/00067 |
| | | | | 382/125 |
| 6,182,892 | B1 * | 2/2001 | Angelo | G06K 9/00046 |
| | | | | 235/380 |
| 6,509,847 | B1 | 1/2003 | Anderson | |
| 6,888,956 | B2 * | 5/2005 | Muramatsu | G06K 9/0012 |
| | | | | 340/5.83 |
| 6,895,104 | B2 * | 5/2005 | Wendt | G06K 9/0008 |
| | | | | 283/69 |
| 7,084,415 | B2 * | 8/2006 | Iwai | G06K 9/0012 |
| | | | | 250/556 |
| 7,181,052 | B2 * | 2/2007 | Fujieda | G06K 9/00067 |
| | | | | 340/5.83 |
| 7,515,252 | B2 * | 4/2009 | Hernandez | G06K 9/00053 |
| | | | | 356/71 |
| 7,656,067 | B2 * | 2/2010 | Dooley | H02K 1/165 |
| | | | | 310/201 |
| 8,605,960 | B2 | 12/2013 | Orsley | |
| 2010/0220900 | A1 | 9/2010 | Orsley | |
| 2013/0129161 | A1 | 5/2013 | Goel | |
| 2015/0161837 | A1 | 6/2015 | Smith | |

FOREIGN PATENT DOCUMENTS

| | | |
|---|---|---|
| CN | 105117630 A | 12/2015 |
| CN | 105160227 A | 12/2015 |
| CN | 105160315 A | 12/2015 |
| WO | 2015096515 A1 | 7/2015 |

OTHER PUBLICATIONS

Written Opinion of the International Search Authority in international application No. PCT/CN2016/101861, dated Jan. 18, 2017, 4 pages.

Extended European search report issued in corresponding European Application No. 17151623.0, dated Jul. 24, 2017, 7 pages.

English translation of International Search Report issued in corresponding International Application No. PCT/CN2016/101861, dated Jan. 18, 2017, 3 pages.

* cited by examiner

METHOD AND DEVICE FOR VERIFYING FINGERPRINT

CROSS-REFERENCE TO RELATED APPLICATIONS

This application is filed based upon and claims priority to Chinese Patent Application No. 201610112807.3, filed on Feb. 29, 2016, the entire contents of which are incorporated herein by reference.

TECHNICAL FIELD

The embodiments of the present disclosure generally relate to the field of computer technology, and more particularly, to a method and device for verifying a fingerprint.

BACKGROUND

In general, before verifying a fingerprint, a terminal prompts a user to place a single finger onto a fingerprint sensor, acquires a fingerprint of the finger through the fingerprint sensor, and determines the fingerprint as a reference fingerprint. In a process of verifying the fingerprint, the terminal acquires a fingerprint, which is to be matched, from the user; whether the fingerprint which is to be matched is the same as the reference fingerprint or not is detected; and when the fingerprint to be matched is the same as the reference fingerprint, it is determined that the verification of the fingerprint is successful.

SUMMARY

The present disclosure provides a method, a device and a computer readable medium for verifying a fingerprint.

According to a first aspect of embodiments of the present disclosure, a method for verifying a fingerprint is provided. The method may include: acquiring N pressing operations successively performed by a finger of a user within an area for acquiring the fingerprint, wherein N>1; generating a sequence of fingerprints to be verified according to fingerprints and pressing intensities of the N pressing operations; comparing the sequence of fingerprints to be verified with a reference sequence of fingerprints; and determining that the fingerprint of the user is successfully verified when the sequence of fingerprints to be verified is the same as the reference sequence of fingerprints.

According to a second aspect of embodiments of the present disclosure, a device for verifying a fingerprint is provided. The device may include: a processor; and a memory configured to store instructions executable by the processor, wherein the processor is configured to: acquire N pressing operations successively performed by a finger of a user within an area for acquiring the fingerprint, wherein N>1; generate a sequence of fingerprints to be verified according to fingerprints and pressing intensities of the N pressing operations; compare the sequence of fingerprints to be verified with a reference sequence of fingerprints; and determine that the fingerprint of the user is successfully verified when the sequence of fingerprints to be verified is the same as the reference sequence of fingerprints.

According to a third aspect of embodiments of the present disclosure, a non-transitory computer-readable storage medium having stored therein instructions is provided. The instructions, when executed by a processor of a mobile terminal, may cause the mobile terminal to perform: acquiring N pressing operations successively performed by a finger of a user within an area for acquiring the fingerprint, wherein N>1; generating a sequence of fingerprints to be verified according to fingerprints and pressing intensities of the N pressing operations; comparing the sequence of fingerprints to be verified with a reference sequence of fingerprints; and determining that the fingerprint of the user is successfully verified when the sequence of fingerprints to be verified is the same as the reference sequence of fingerprints.

It is to be understood that the above general descriptions and following detailed descriptions are only exemplary and not intended to limit the present disclosure.

BRIEF DESCRIPTION OF THE DRAWINGS

The accompanying drawings, which are incorporated into and constitute a part of the specification of the embodiments of the disclosure, illustrate embodiments consistent with the present disclosure and, together with the specification, serve to explain the principles of the present disclosure.

Figure 1:
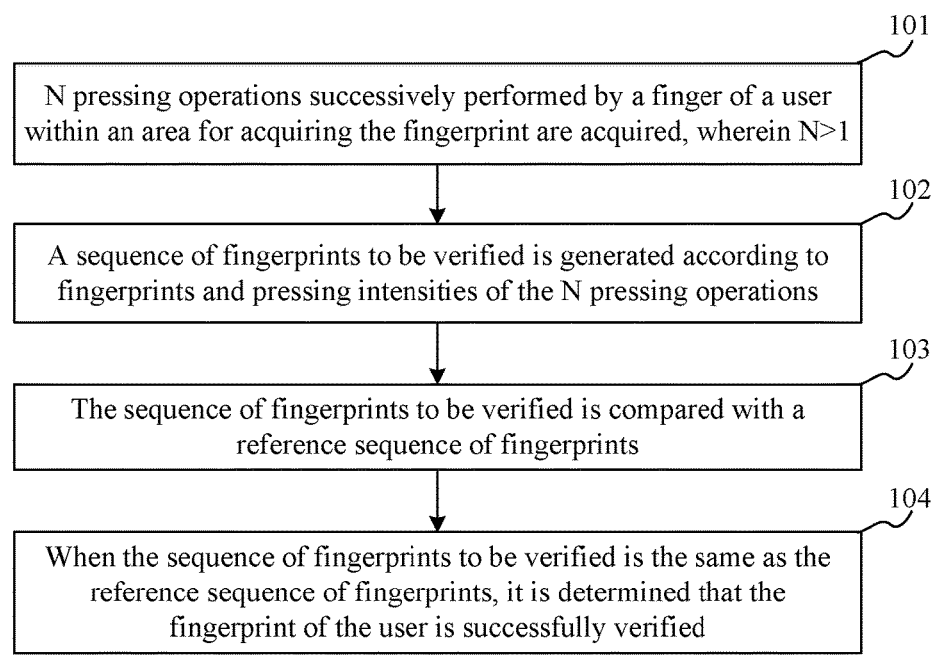
FIG. 1 is a flow chart showing a method for verifying a fingerprint according to an exemplary embodiment.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Description will now be made in detail on exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the embodiments of the present disclosure. Instead, they are merely examples of devices and methods consistent with some aspects related to the embodiments of the present disclosure as recited in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

FIG. 1 is a flow chart showing a method for verifying a fingerprint according to an exemplary embodiment, which is applied to a terminal. As shown in FIG. 1, the method for verifying a fingerprint may include the following steps.

In Step 101, N pressing operations successively performed by a finger of a user within an area for acquiring the fingerprint are acquired, wherein N>1.

In Step 102, a sequence of fingerprints to be verified is generated according to fingerprints and pressing intensities of the N pressing operations.

In Step 103, the sequence of fingerprints to be verified is compared with a reference sequence of fingerprints.

In Step 104, when the sequence of fingerprints to be verified is the same as the reference sequence of fingerprints, it is determined that the fingerprint of the user is successfully verified.

From the above, according to the method for verifying a fingerprint provided by the embodiments of the present disclosure, the N pressing operations successively performed by the finger of the user in the area for acquiring the fingerprint are acquired; the sequence of fingerprints to be verified is generated according to the fingerprints and the pressing intensities of the N pressing operations; the sequence of fingerprints to be verified is compared with the reference sequence of fingerprints; when the sequence of fingerprints to be verified is the same as the reference sequence of fingerprints, it is determined that the fingerprint of the user is successfully verified; and the sequence of fingerprints to be verified may be obtained by incorporating the pressing intensities, and the sequence of fingerprints to be verified may be utilized for fingerprint verification. Thus the problem that the terminal is insecure due to the fact that the fingerprint of the user is leaked or compromised when a static fingerprint image to be verified is utilized for fingerprint verification is solved, and the effect of improving security of the terminal is achieved.

Figure 2A:
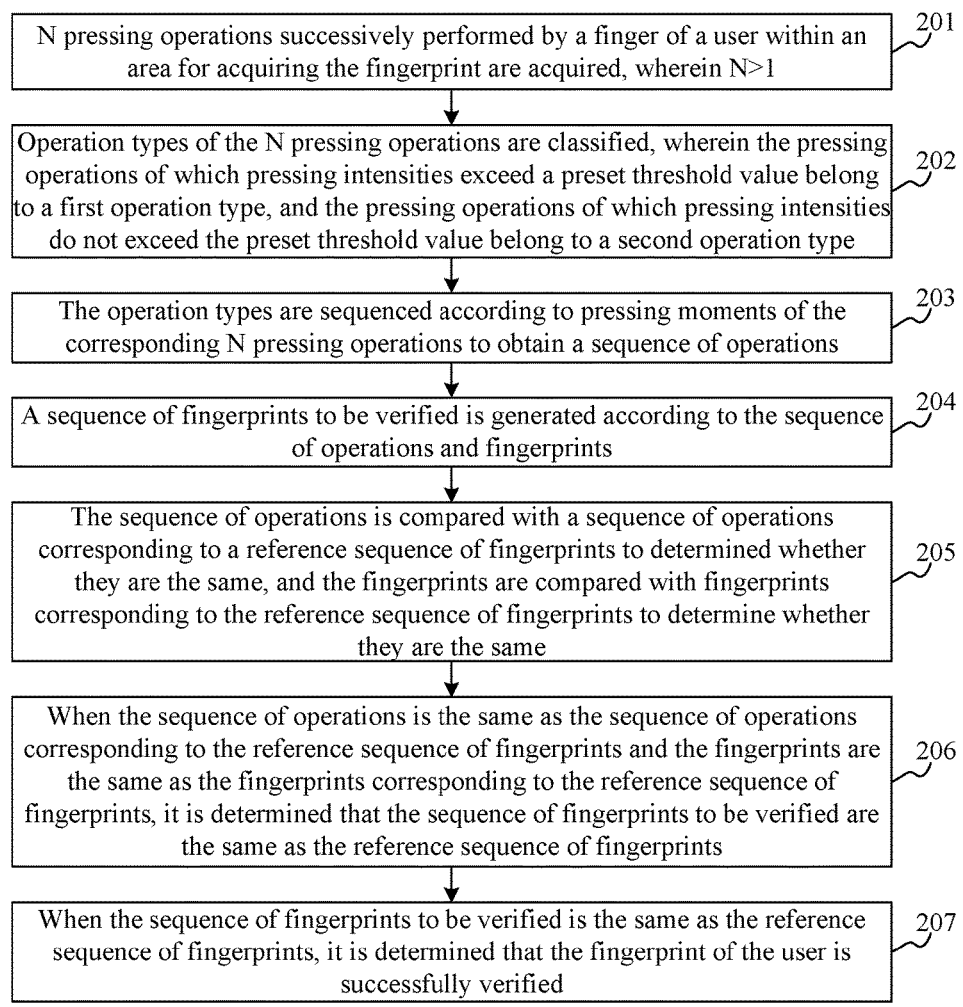
FIG. 2A is a flow chart showing another method for verifying a fingerprint, according to another exemplary embodiment.

FIG. 2A is a flow chart showing a method for verifying a fingerprint according to another exemplary embodiment, which is applied to a terminal. As shown in FIG. 2A, the method for verifying a fingerprint may include the following steps.

In Step 201, N pressing operations successively performed by a finger of a user within an area for acquiring the fingerprint are acquired, wherein N>1.

The area for acquiring the fingerprint is an area where a fingerprint sensor is arranged. When the finger of the user acts on the area for acquiring the fingerprint, the fingerprint sensor may acquire a fingerprint of the user and determine the fingerprint as a fingerprint image to be verified for performing subsequent verification.

When the finger of the user statically acts on the area for acquiring the fingerprint, and the fingerprint sensor acquires a static fingerprint image to be verified. When the static fingerprint image to be verified is leaked, another person may freely operate the terminal when inputting the static fingerprint image to be verified for verification, so that the terminal is insecure. Moreover, the fingerprint is unchangeable. Once the static fingerprint image to be verified is leaked, it is impossible for the user to modify the fingerprint.

In the embodiment, the terminal may acquire a dynamic fingerprint image to be verified generated by a plurality of pressing operations successively performed by the finger. Thus, even if the static fingerprint image to be verified is leaked, security of the terminal may not be compromised, and the security of the terminal is improved.

In the embodiment, a pressing operation is implemented by the finger by contacting the area for acquiring the fingerprint and also leaving the area for acquiring the fingerprint, and the terminal may acquire N successive pressing operations. In one implementation, the terminal may acquire a period of time between two successive pressing operations. It is determined that the two pressing operations are successive when the period of time does not exceed a threshold value for a period of time, and it is determined that the two pressing operations are not successive when the period of time exceeds the threshold value for the period of time.

In Step 202, operation types of the N pressing operations are classified, where the pressing operations of which pressing intensities exceed a preset threshold value belong to a first operation type, and the pressing operations of pressing intensities do not exceed the preset threshold value belong to a second operation type.

The terminal reads a preset threshold value which is set in advance, and sequentially compares the pressing intensities of each pressing operation with the preset threshold value. When the pressing intensity of a certain pressing operation exceeds the preset threshold value, it is determined that the pressing operation belongs to the first operation type, and when the pressing intensity of a certain pressing operation does not exceed the preset threshold value, it is determined that the pressing operation belongs to the second operation type. The preset threshold value may be set by a user himself/herself or may be set by other ways.

The pressing intensity may measure how hard the finger presses when the fingerprint is acquired. If a pressing intensity is 3, when the preset threshold value is 1 and the pressing intensity exceeds the preset threshold value, it is determined that the corresponding pressing operation is heavy pressure. When the preset threshold value is 4 and the pressing intensity does not exceed the preset threshold value, it is determined that the corresponding pressing operation is light pressure. The unit of the pressing intensity is the same as a unit of the preset threshold value.

In Step 203, the operation types are sequenced according to pressing moments of the corresponding N pressing operations to obtain a sequence of operations.

Since the user sequentially performs the pressing operations within the area for acquiring the fingerprint, each of the pressing operation is performed at different pressing moments. The terminal may sequence the operation types according to the pressing moments in chronological order to obtain the sequence of operations.

For example, if the pressing operations 1, 2, 3, 4, 5 and 6 are sequenced according to the pressing moments in chronological order, and the operation types of the six pressing operations are heavy pressure, heavy pressure, light pressure, heavy pressure, light pressure and light pressure respectively, the obtained sequence of operations is represented as heavy pressure, heavy pressure, light pressure, heavy pressure, light pressure and light pressure. Thus, the sequence of operations may be similar to a Morse code.

In Step 204, a sequence of fingerprints to be verified is generated according to the sequence of operations and fingerprints.

In the embodiment, the terminal may acquire the same or different fingerprints acquired by each pressing operation. In an application scenario is that the user successively performs the N pressing operations by the same finger, the same fingerprint is acquired. In an application scenario is that the user successively performs the N pressing operations by different fingers, different fingerprints are acquired.

One example of the sequence of fingerprints to be verified may be represented as fingerprint 1, heavy pressure; fingerprint 1, heavy pressure; fingerprint 1, light pressure; fingerprint 1, heavy pressure; fingerprint 1, light pressure; and fingerprint 1, light pressure.

In Step 205, the sequence of operations is compared with a sequence of operations corresponding to a reference sequence of fingerprints to determine whether they are the same, and the fingerprints compared with fingerprints corresponding to the reference sequence of fingerprints to determine whether they are the same.

The reference sequence of fingerprints refers to a sequence of fingerprints set by an owner of the terminal for verification before the verification is conducted. The process for the terminal to acquire the reference sequence of fingerprints is the same as the process of acquiring the sequence of fingerprints to be verified.

In the embodiment, the reference sequence of fingerprints is determined as follows:

1) M pressing operations successively performed by a finger of the user within the area for acquiring the fingerprint are acquired, wherein M>1;

2) operation types of the M pressing operations are classified, wherein the pressing operations of which pressing intensities exceed a preset threshold value belong to a first operation type, and the pressing operations of which pressing intensities do not exceed the preset threshold value belong to a second operation type;

3) the operation types are sequenced according to the moments when the M pressing operations are performed respectively to obtain a sequence of operations; and 4) the reference sequence of fingerprints is generated according to the sequence of operations and the fingerprints.

After the sequence of fingerprints to be verified and the reference sequence of fingerprints are obtained, the terminal is required to compare the sequence of fingerprints to be verified with the reference sequence of fingerprints. In case the same fingerprints are acquired in multiple operations in a sequence when the sequence of fingerprints to be verified is the same as the reference sequence of fingerprints, it is determined that the fingerprint of the user is successfully verified; and when the sequence of fingerprints to be verified is different from the reference sequence of fingerprints, it is determined that the fingerprint of the user is failed to be verified.

In case multiple fingerprints are acquired in multiple operations in a sequence, when the sequence of fingerprints to be verified is compared with the reference sequence of fingerprints, the sequence of operations may be compared with the sequence of operations corresponding to the reference sequence of fingerprints to determine whether they are the same, and the fingerprints are compared with the fingerprints corresponding to the reference sequence of fingerprints to determine whether they are the same. The verification is successful when both the sequence and fingerprints are matched between the acquired sequence/fingerprints and the reference sequence/fingerprints. Otherwise, the verification fails.

Other sequence of comparison of the sequence of operations and comparison of the fingerprints may be possible. For example, the sequence of the operations can be compared firstly, and then the fingerprints can be compared secondly, or the fingerprints can be compared firstly, and then the sequence of the operations can be compared secondly.

The comparison may be conducted when the sequence records the appearance of multiple different fingerprints. For example, there may be five fingerprints 1, 2, 3, 4 and 5 in the reference. Two of them 3 and 4 may be the same. As such, there may be four different fingerprints a, b, c and d in the reference. One example reference sequence may be fingerprint a, fingerprint b, fingerprint c, fingerprint c and fingerprint d. Once, the multiple fingerprints are acquired for verification, they may be compared with the reference. When the acquired fingerprints has all 4 types of fingerprints in the reference and they are in the sequence of fingerprint a, fingerprint b, fingerprint c, fingerprint c and fingerprint d, the verification is successful, otherwise, the verification fails.

In Step 206, when the sequence of operations is the same as the sequence of operations corresponding to the reference sequence of fingerprints and the fingerprints are the same as the fingerprints corresponding to the reference sequence of fingerprints, it is determined that the sequence of fingerprints to be verified is the same as the reference sequence of fingerprints.

In Step 207, when the sequence of fingerprints to be verified is the same as the reference sequence of fingerprints, it is determined that the fingerprint of the user is successfully verified.

Since whether a fingerprint is successfully verified or not is related to a number of pressing operations, a fingerprint is failed to be verified in case of the mismatched number of pressing operations; and a fingerprint can be successfully verified in case of the matched number of pressing.

Moreover, since more resources are required to be consumed by generation of a dynamic sequence of fingerprints to be verified, the terminal may eliminate fingerprints to be verified without a matched number of pressing operations at first and does not generate a sequence of fingerprints to be verified for these fingerprints to save resources. Therefore, the method provided in this disclosure may further include:

1) whether a number of the N pressing operations is the same as a number of pressing operations performed for generating the reference sequence of fingerprints or not is detected;

2) when the number of the N pressing operations is different from the number of pressing operations performed for generating the reference sequence of fingerprints, it is determined that the fingerprint of the user is failed to be verified; and 3) when the number of the N pressing operations is the same as the number of pressing operations performed for generating the reference sequence of fingerprints, Step 202 is triggered and further comparison may be needed For example, when the number of pressing operations performed for generating the reference sequence of fingerprints is 5 and the number of pressing operations performed for generating the sequence of fingerprints to be verified is 4, it may be directly determined that the fingerprint is failed to be verified. When the number of pressing operations performed for generating the sequence of fingerprints to be verified is 5, the sequence of fingerprints to be verified is generated, the sequence of fingerprints to be verified is compared with the reference sequence of fingerprints, and whether the finger is verified successfully or not is determined according to the result of the comparison.

It is to be noted that the owner of the terminal may reset the reference sequence of fingerprints according to a new number of pressing operations and pressing intensities when the dynamic sequence of fingerprints to be verified may be compromised. Thus, the reference sequence of fingerprints can be different from the leaked sequence of fingerprints to be verified, so that security of the terminal is ensured.

Figure 2B:
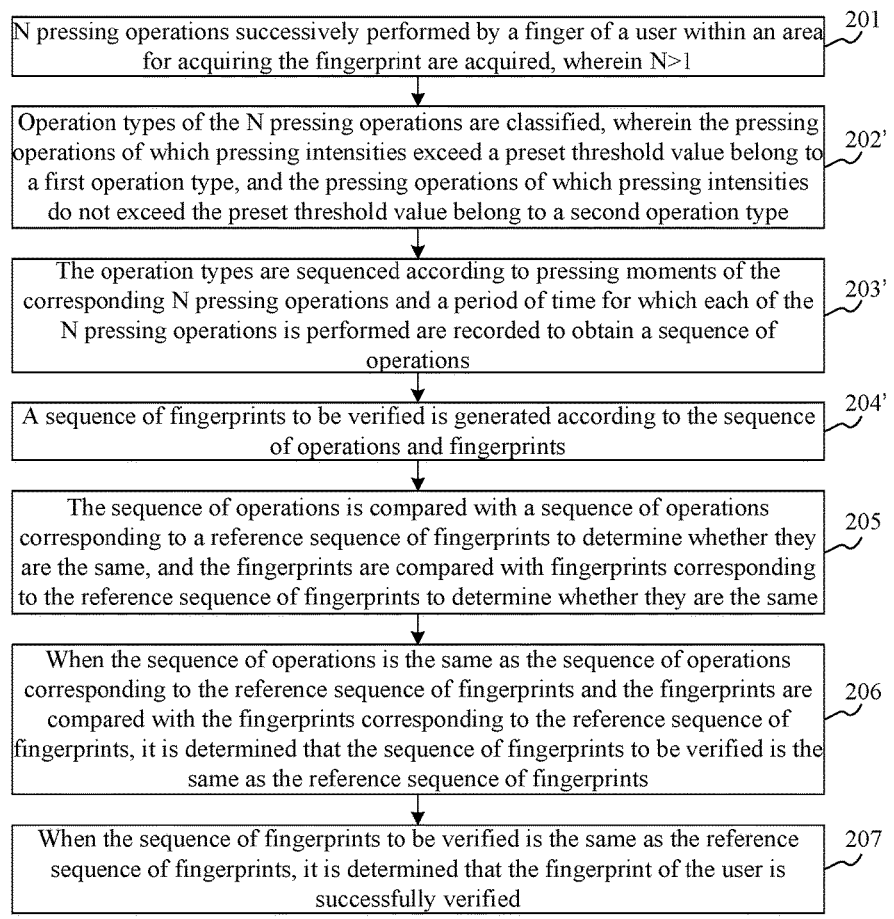
FIG. 2B is a flow chart showing another method for verifying a fingerprint according to an exemplary embodiment.

FIG. 2B is a flow chart showing another method for verifying a fingerprint, wherein Steps 202-204 may also be replaced with the following steps.

In Step 202', operation types of the N pressing operations are classified, wherein the pressing operations of which pressing intensities exceed a preset threshold value belong to a first operation type and the pressing operations of which the pressing intensities do not exceed the preset threshold value belong to a second operation type.

Step 202' is the same as Step 202, and will not be elaborated herein.

In Step 203', the operation types are sequenced according to pressing moments of the corresponding N pressing operations, and a period of time for which each of the N pressing operations is performed are recorded to obtain a sequence of operations.

For example, if the pressing operations 1, 2, 3, 4, 5 and 6 are sequenced according to the pressing moments in chronological order, the operation types of the six pressing operations are heavy pressure, heavy pressure, light pressure, heavy pressure, light pressure and light pressure respectively and the pressing time periods are 3 seconds, 1 second, 2 seconds, 3 seconds, 1 second and 3 seconds respectively, the obtained sequence of operations may be represented as heavy pressure, 3 s; heavy pressure, 1 s; light pressure, 2 s; heavy pressure, 3 s; light pressure, 1 s; and light pressure, 3 s.

Optionally, since the user may not accurately determine the period of time, which may cause that a fingerprint is failed to be verified, the terminal may further set a time threshold value, classify the pressing operation of which the pressing period of time exceeds the time threshold value into long pressing and classify the pressing operation of which the pressing period of time does not exceed the time threshold value into short pressing. The time threshold value may be set by a user himself/herself or any other methods.

For example, if the time threshold value is 1 second, the obtained sequence of operations is represented as heavy pressure, long pressing, heavy pressure, short pressing; light pressure, long pressing; heavy pressure, long pressing; light pressure, short pressing; and light pressure, long pressing.

In Step 204', the sequence of fingerprints to be verified is generated according to the sequence of operations and the fingerprints.

In the embodiment, the terminal may acquire the same or different fingerprints via the respective pressing operations. In an application scenario where the user successively performs the N pressing operations by the same finger, the same fingerprint is acquired. In an application scenario where the user successively executes the N pressing operations by different fingers, different fingerprints are acquired.

The sequence of fingerprints to be verified may be represented as fingerprint 1, heavy pressure, long pressing; fingerprint 2, heavy pressure, short pressing; fingerprint 1, light pressure, long pressing; fingerprint 1, heavy pressure, long pressing; fingerprint 3, light pressure, short pressing; and fingerprint 1, light pressure, long pressing.

Since FIG. 2B provides another method for acquiring the sequence of fingerprints to be verified, a method for the terminal to acquire the reference sequence of fingerprints is also required to be accordingly changed, and a process for the terminal to acquire the reference sequence of fingerprints is the same as the process of acquiring the sequence of fingerprints to be verified.

In the embodiment, the reference sequence of fingerprints is determined in a manner as follows:

1) M pressing operations successively performed by a finger of the user within the area for acquiring the fingerprint are acquired, wherein M>1;

2) operation types of the M pressing operations are classified, wherein the pressing operations of which pressing intensities exceed a preset threshold value belong to a first operation type, and the pressing operations of which pressing intensities do not exceed the preset threshold value belong to a second operation type;

3) the operation types are sequenced according to pressing moments of the M pressing operations, and a period of time for which each of the N pressing operations is performed are recorded to obtain a sequence of operations; and 4) the sequence of fingerprints to be verified is generated according to the sequence of operations and the fingerprints.

From the above, according to the method for verifying a fingerprint provided by the embodiments of the present disclosure, the N pressing operations successively performed by the finger of the user within the area for acquiring the fingerprint are acquired; the sequence of fingerprints to be verified is generated according to the fingerprints and the pressing intensities of the N pressing operations; the sequence of fingerprints to be verified is compared with the reference sequence of fingerprints; when the sequence of fingerprints to be verified is the same as the reference sequence of fingerprints, it is determined that the fingerprint of the user is successfully verified; and the sequence of fingerprints to be verified may be obtained by incorporating the pressing intensities, and the sequence of fingerprints to be verified may be utilized for fingerprint verification. Thus, the problem that the terminal is insecure due to the fact that the fingerprint of the user is leaked or compromised when a static fingerprint image to be verified is utilized for fingerprint verification is solved, and the effect of improving security of the terminal is achieved.

When the number of the N pressing operations is different from the number of pressing operations performed for generating the reference sequence of fingerprints, it is determined that the fingerprint of the user is failed to be verified. Since it is easy to determine the number of pressing operations, the fingerprints to be verified without a matched number of pressing operations may be eliminated. Thus, the problem that the resource is wasted caused by generation of a sequence of fingerprints to be verified for these fingerprints is solved, and the effect of saving resources is achieved.

Figure 3:
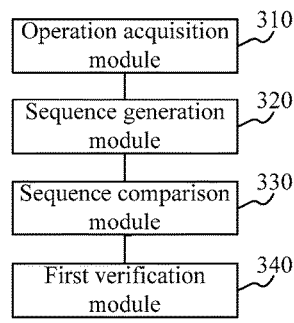
FIG. 3 is a block diagram showing a device for verifying a fingerprint according to an exemplary embodiment.

FIG. 3 is a block diagram showing a device for verifying a fingerprint according to an exemplary embodiment, which is applied to a terminal. As shown in FIG. 3, the device for verifying a fingerprint includes an operation acquisition module 310, a sequence generation module 320, a sequence comparison module 330 and a first verification module 340.

The operation acquisition module 310 is configured to acquire N pressing operations successively performed by a finger of a user within an area for acquiring the fingerprint, wherein N>1.

The sequence generation module 320 is configured to generate a sequence of fingerprints to be verified according to fingerprints and pressing intensities of the N pressing operations acquired by the operation acquisition module 310.

The sequence comparison module 330 is configured to compare the sequence of fingerprints to be verified generated by the sequence generation module 320 with a reference sequence of fingerprints.

The first verification module 340 is configured to, when the sequence comparison module 330 determines that the sequence of fingerprints to be verified is the same as the reference sequence of fingerprints, determine that the fingerprint of the user is successfully verified.

From the above, according to the device for verifying a fingerprint provided by the embodiments of the present disclosure, the N pressing operations successively performed by the finger of the user within the area for acquiring the fingerprint are acquired; the sequence of fingerprints to be verified is generated according to the fingerprints and the pressing intensities of the N pressing operations; the sequence of fingerprints to be verified is compared with the reference sequence of fingerprints; when the sequence of fingerprints to be verified is the same as the reference sequence of fingerprints, it is determined that the fingerprint of the user is successfully verified; and the sequence of fingerprints to be verified may be obtained by incorporating the pressing intensities, and the sequence of fingerprints to be verified may be utilized for fingerprint verification. Thus, the problem that the terminal is insecure due to the fact that the fingerprint of the user is leaked or compromised when a static fingerprint image to be verified is utilized for fingerprint verification is solved, and the effect of improving security of the terminal is achieved.

Figure 4:
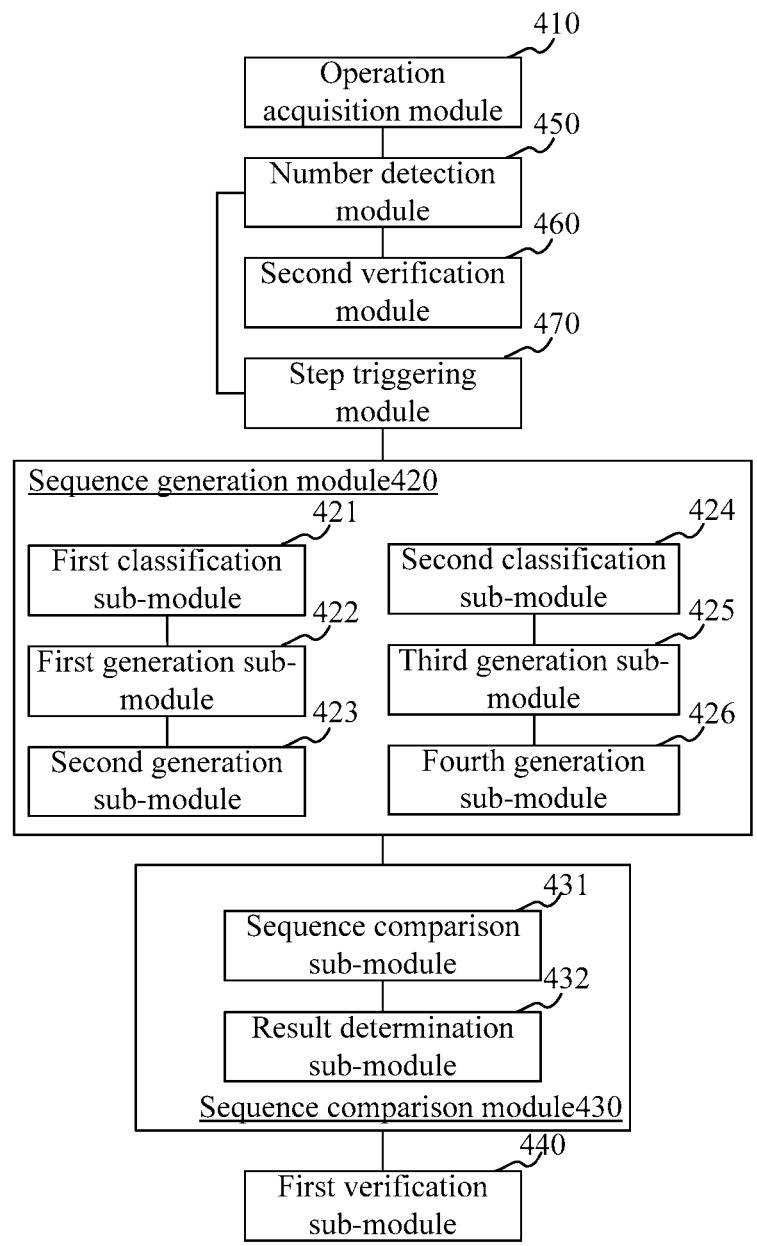
FIG. 4 is a block diagram showing a device for verifying a fingerprint according to another exemplary embodiment.

FIG. 4 is a block diagram showing a device for verifying a fingerprint according to another exemplary embodiment, which is applied to a terminal. As shown in FIG. 4, the device for verifying a fingerprint includes an operation acquisition module 410, a sequence generation module 420, a sequence comparison module 430 and a first verification module 440.

The operation acquisition module 410 is configured to acquire N pressing operations successively performed by a finger of a user within an area for acquiring the fingerprint, wherein N>1.

The sequence generation module 420 is configured to generate a sequence of fingerprints to be verified according to pressing intensities of the N pressing operations acquired by the operation acquisition module 410 and fingerprints.

The sequence comparison module 430 is configured to compare the sequence of fingerprints to be verified generated by the sequence generation module 420 with a reference sequence of fingerprints.

The first verification module 440 is configured to, when the sequence comparison module 430 determines that the sequence of fingerprints to be verified is the same as the reference sequence of fingerprints, determine that the fingerprint of the user is successfully verified.

Optionally, the sequence generation module 420 includes a first classification sub-module 421, a first generation sub-module 422 and a second generation sub-module 423.

The first classification sub-module 421 is configured to classify operation types of the N pressing operations, wherein the pressing operations of which the pressing intensities exceed a preset threshold value belong to a first operation type and the pressing operations of which the pressing intensities do not exceed the preset threshold value belong to a second operation type.

The first generation sub-module 422 is configured to sequence the operation types according to pressing moments of the corresponding N pressing operations to obtain a sequence of operations.

The second generation sub-module 423 is configured to generate the sequence of fingerprints to be verified according to the sequence of operations generated by the first generation sub-module 422 and the fingerprints.

Optionally, the sequence generation module 420 includes a second classification sub-module 424, a third generation sub-module 425 and a fourth generation sub-module 426.

The second classification sub-module 424 is configured to classify operation types of the N pressing operations, wherein the pressing operations of which the pressing intensities exceed a preset threshold value belong to a first operation type and the pressing operations of which the pressing intensities do not exceed the preset threshold value belong to a second operation type.

The third generation sub-module 425 is configured to sequence the operation types according to pressing moments of the corresponding N pressing operations, and record a period of time for which each of the N pressing operations is performed to obtain a sequence of operations.

The fourth generation sub-module 426 is configured to generate the sequence of fingerprints to be verified according to the sequence of operations generated by the third generation sub-module 425 and the fingerprints.

Optionally, the sequence comparison module 430 includes a sequence comparison sub-module 431 and a result determination sub-module 432.

The sequence comparison sub-module 431 is configured to compare the sequence of operations and a sequence of operations corresponding to the reference sequence of fingerprints to determine whether they are the same, and compare the fingerprints and the fingerprints corresponding to the reference sequence of fingerprints to determine whether they are the same.

The result determination sub-module 432 is configured to, when the sequence comparison sub-module 431 determines that the sequence of operations is the same as the sequence of operations corresponding to the reference sequence of fingerprints and the fingerprints are the same as the fingerprints corresponding to the reference sequence of fingerprints, determine that the sequence of fingerprints to be verified is the same as the reference sequence of fingerprints.

Optionally, the device provided by the embodiment further includes a number detection module 450, a second verification module 460 and a step triggering module 470.

The number detection module 450 is configured to detect whether a number of the N pressing operations is the same as a number of pressing operations performed for generating the reference sequence of fingerprints or not.

The second verification module 460 is configured to, when a result of the detection of the number detection module 450 indicates that the number of the N pressing operations is different from the number of pressing operations performed for generating the reference sequence of fingerprints, determine that the fingerprint of the user is failed to be verified.

The step triggering module 470 is configured to, when the result of the detection of the number detection module 450 indicates that the number of the N pressing operations is the same as the number of pressing operations performed for generating the reference sequence of fingerprints, trigger the sequence generation module 420 to perform the step of generating the sequence of fingerprints to be verified according to the fingerprints and the pressing intensities of the N pressing operations.

From the above, according to the device for verifying a fingerprint provided by the embodiments of the present disclosure, the N pressing operations successively performed by the finger of the user within the area for acquiring the fingerprint are acquired; the sequence of fingerprints to be verified is generated according to the fingerprints and the pressing intensities of the N pressing operations; the sequence of fingerprints to be verified is compared with the reference sequence of fingerprints; when the sequence of fingerprints to be verified is the same as the reference sequence of fingerprints, it is determined that the fingerprint of the user is successfully verified; and the sequence of fingerprints to be verified may be obtained by incorporating the pressing intensities, and the sequence of fingerprints to be verified may be utilized for fingerprint verification. Thus, the problem that the terminal is insecure due to the fact that the fingerprint of the user is leaked or compromised when a static fingerprint image to be verified is utilized for fingerprint verification is solved, and the effect of improving security of the terminal is achieved.

When the number of the N pressing operations is different from the number of pressing operations performed for generating the reference sequence of fingerprints, it is determined that the fingerprint of the user is failed to be verified. Since it is easy to determine the number of pressing operations, fingerprints to be verified without a matched number of pressing operations may be eliminated. Thus, the problem that the resource is wasted caused by generation of a sequence of fingerprints to be verified for these fingerprints is solved, and the effect of saving resources is achieved.

The devices shown in FIGS. 3 and 4 merely illustrate two implementations to practice the methods disclosed herein. Other devices may also be developed to practice the methods disclosed herein.

An exemplary embodiment of the embodiments of the present disclosure provides a device for verifying a fingerprint, which may implement a method for verifying a fingerprint provided by the embodiments of the present disclosure. The device for verifying a fingerprint includes a processor and a memory configured to store instructions extractable by the processor.

The processor is configured to:

acquire N pressing operations successively performed by a finger of a user within an area for acquiring the fingerprint, wherein N>1;

generate a sequence of fingerprints to be verified according to fingerprints and pressing intensities of the N pressing operations;

compare the sequence of fingerprints to be verified with a reference sequence of fingerprints; and when the sequence of fingerprints to be verified is the same as the reference sequence of fingerprints, determine that the fingerprint of the user is successfully verified.

Figure 5:
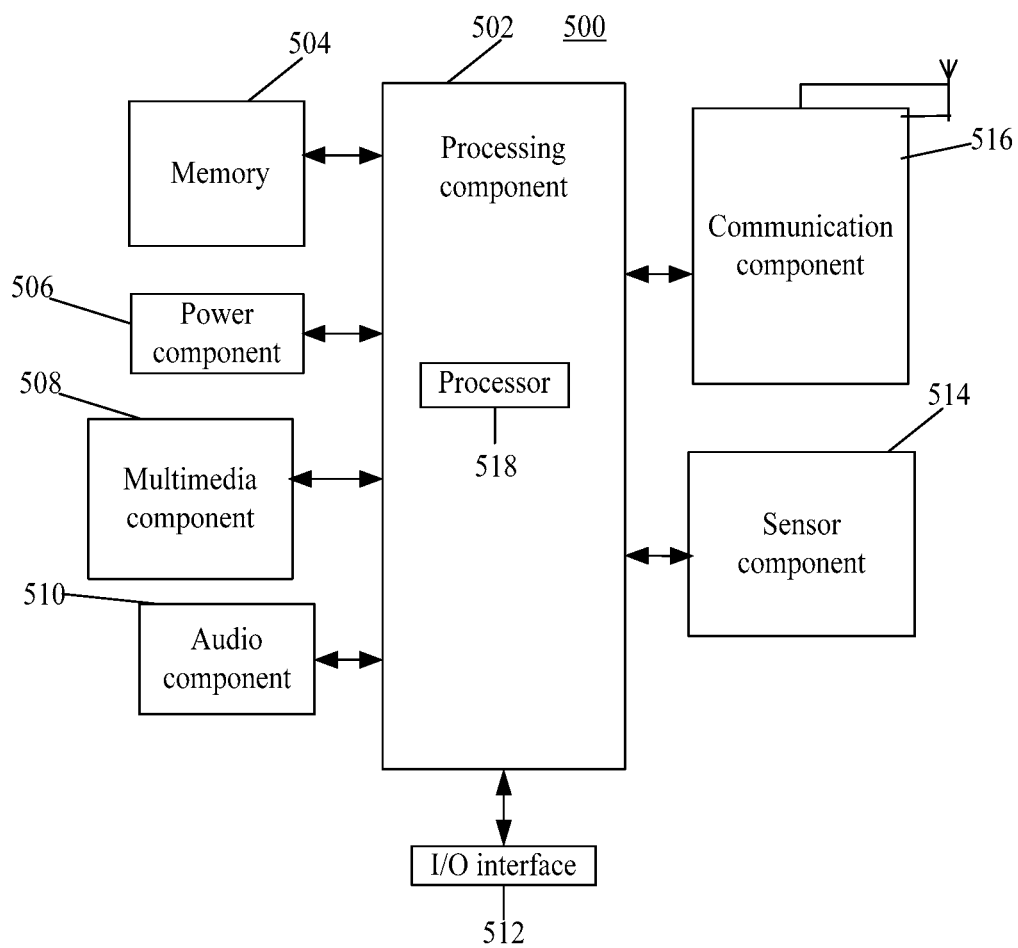
FIG. 5 is a block diagram showing a device configured for verifying a fingerprint according to an exemplary embodiment.

FIG. 5 is a block diagram showing a device 500 for verifying a fingerprint according to an exemplary embodiment. For example, the device 500 may be a mobile phone, a computer, a digital broadcast terminal, a messaging device, a gaming console, a tablet, a medical device, fitness facility, a personal digital assistant or the like.

Referring to FIG. 5, the device 500 may include one or more of a processing component 502, a memory 504, a power component 506, a multimedia component 508, an audio component 510, an Input/Output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 518 to execute instructions to perform all or part of the steps in the abovementioned method. Moreover, the processing component 502 may include one or more modules which facilitate interaction between the processing component 502 and the other components. For instance, the processing component 502 may include a multimedia module to facilitate interaction between the multimedia component 508 and the processing component 502.

The memory 504 is configured to store various types of data to support the operation of the device 500. Examples of such data include instructions for any application programs or methods operated on the device 500, contact data, phonebook data, messages, pictures, video, etc. The memory 504 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 506 provides power for various components of the device 500. The power component 506 may include a power management system, one or more power supplies, and other components associated with the generation, management and distribution of power for the device 500.

The multimedia component 508 includes a screen for providing an output interface between the device 500 and a user. In some embodiments, the screen may include a Liquid Crystal Display (LCD) and a Touch Panel (TP). If the screen is the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 508 includes a front camera and/or a rear camera. The front camera and/or the rear camera may receive external multimedia data when the device 500 is in an operation mode, such as a photographing mode or a video mode. Each of the front camera and the rear camera may be a fixed optical lens system or have capabilities of focusing and optical zooming.

The audio component 510 is configured to output and/or input an audio signal. For example, the audio component 510 includes a Microphone (MIC) which is configured to receive an external audio signal when the device 500 is in the operation mode, such as a call mode, a recording mode and a voice recognition mode. The received audio signal may be further stored in the memory 504 or sent through the communication component 516. In some embodiments, the audio component 510 further includes a speaker configured to output the audio signal.

The I/O interface 512 provides an interface between the processing component 502 and a peripheral interface module which may be a keyboard, a click wheel, a button or the like. The button may include, but not limited to, a home button, a volume button, a starting button and a locking button.

The sensor component 514 includes one or more sensors configured to provide status assessment in various aspects for the device 500. For instance, the sensor component 514 may detect an on/off status of the device 500 and relative positioning of components, such as a display and small keyboard of the device 500. The sensor component 514 may also detect a change in a position of the device 500 or a component of the device 500, presence or absence of contact between the user and the device 500, orientation or acceleration/deceleration of the device 500 and a change in temperature of the device 500. The sensor component 514 may include a proximity sensor configured to detect presence of an object nearby without any physical contact. The sensor component 514 may also include a light sensor, such as a Complementary Metal Oxide Semiconductor (CMOS) or Charge Coupled Device (CCD) image sensor, configured for use in an imaging application. In some embodiments, the sensor component 514 may also include an acceleration sensor, a gyroscope sensor, a magnetic sensor, a pressure sensor or a temperature sensor. The sensor component 514 may include a fingerprint sensor, configured to acquire a fingerprint of a user.

The communication component 516 is configured to facilitate wired or wireless communication between the device 500 and another device. The device 500 may access a communication-standard-based wireless network, such as a Wireless Fidelity (WiFi) network, a 2nd-Generation (2G) or 3rd-Generation (3G) network or a combination thereof. In an exemplary embodiment, the communication component 516 receives a broadcast signal or broadcast associated information from an external broadcast management system through a broadcast channel. In an exemplary embodiment, the communication component 516 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BlueTooth (BT) technology and another technology.

In an exemplary embodiment, the device 500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components which are configured to execute the above-mentioned method.

In an exemplary embodiment, there is also provided a non-transitory computer-readable storage medium including instructions, such as the memory 504 containing instructions, which may be executed by the processor 518 of the device 500 to implement the abovementioned method. For example, the non-transitory computer-readable storage medium may be a ROM, a Compact Disc Read-Only Memory (CD-ROM), a magnetic tape, a floppy disc, an optical data storage device or the like.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors.

Other embodiments of the present disclosure will be apparent to those skilled in the art from consideration of the specification and practice of the present disclosure. This application is intended to cover any variations, uses, or adaptations of the embodiments of the present disclosure following the general principles the embodiments of the disclosure and including common knowledge or conventional means in the art which are not disclosed by the embodiments of the disclosure. It is intended that the specification and examples are considered as exemplary only, and a true scope and spirit of the present disclosure are indicated by the following claims.

It will be appreciated that the embodiments of the present disclosure is not limited to the exact construction that has been described above and illustrated in the accompanying drawings, and that various modifications and changes may be made without departing from the scope the embodiments of the present disclosure. It is intended that the scope of the present disclosure only be defined by the appended claims.

What is claimed is:

1. A method for verifying a fingerprint, comprising:
acquiring N pressing operations successively performed by a finger of a user within an area for acquiring the fingerprint, wherein N>1;
generating a sequence of fingerprints to be verified according to fingerprints and pressing intensities of the N pressing operations;
comparing the sequence of fingerprints to be verified with a reference sequence of fingerprints; and
determining that the fingerprint of the user is successfully verified when the sequence of fingerprints to be verified is the same as the reference sequence of fingerprints,
wherein generating the sequence of fingerprints to be verified according to the fingerprints and the pressing intensities of the N pressing operations further comprises:

classifying operation types of the N pressing operations, wherein the pressing operations of which the pressing intensities exceed a preset threshold value belong to a first operation type and the pressing operations of which the pressing intensities do not exceed the preset threshold value belong to a second operation type;

sequencing the operation types according to pressing moments of the corresponding N pressing operations to obtain a sequence of operations; and generating the sequence of fingerprints to be verified according to the sequence of operations and the fingerprints.

2. The method according to claim 1, further comprising:
after sequencing the operation types according to pressing moments of the corresponding N pressing operations, recording a period of time for which each of the N pressing operations is performed to obtain the sequence of operations.

3. The method according to claim 2, wherein comparing the sequence of fingerprints to be verified with the reference sequence of fingerprints comprises:

comparing the sequence of operations with a sequence of operations corresponding to the reference sequence of fingerprints to determine whether they are the same, and comparing the fingerprints with fingerprints corresponding to the reference sequence of fingerprints to determine whether they are the same; and determining that the sequence of fingerprints to be verified is the same as the reference sequence of fingerprints when the sequence of operations is the same as the sequence of operations corresponding to the reference sequence of fingerprints and the fingerprints are the same as the fingerprints corresponding to the reference sequence of fingerprints.

4. The method according to claim 2, further comprising:
detecting whether a number of the N pressing operations is the same as a number of pressing operations performed for generating the reference sequence of fingerprints;

when the number of the N pressing operations is different from the number of pressing operations performed for generating the reference sequence of fingerprints, determining that the fingerprint of the user is failed to be verified; and when the number of the N pressing operations is the same as the number of pressing operations performed for generating the reference sequence of fingerprints, triggering the step of generating the sequence of fingerprints to be verified according to the fingerprints and the pressing intensities of the N pressing operations.

5. The method according to claim 1, wherein comparing the sequence of fingerprints to be verified with the reference sequence of fingerprints comprises:

comparing the sequence of operations with a sequence of operations corresponding to the reference sequence of fingerprints to determine whether they are the same, and comparing the fingerprints with fingerprints corresponding to the reference sequence of fingerprints to determine whether they are the same; and determining that the sequence of fingerprints to be verified is the same as the reference sequence of fingerprints when the sequence of operations is the same as the sequence of operations corresponding to the reference sequence of fingerprints and the fingerprints are the same as the fingerprints corresponding to the reference sequence of fingerprints.

6. The method according to claim 5, further comprising:
detecting whether a number of the N pressing operations is the same as a number of pressing operations performed for generating the reference sequence of fingerprints;

when the number of the N pressing operations is different from the number of pressing operations performed for generating the reference sequence of fingerprints, determining that the fingerprint of the user is failed to be verified; and when the number of the N pressing operations is the same as the number of pressing operations performed for generating the reference sequence of fingerprints, triggering the step of generating the sequence of fingerprints to be verified according to the fingerprints and the pressing intensities of the N pressing operations.

7. The method according to claim 1, further comprising:
detecting whether a number of the N pressing operations is the same as a number of pressing operations performed for generating the reference sequence of fingerprints;

when the number of the N pressing operations is different from the number of pressing operations performed for generating the reference sequence of fingerprints, determining that the fingerprint of the user is failed to be verified; and when the number of the N pressing operations is the same as the number of pressing operations performed for generating the reference sequence of fingerprints, triggering the step of generating the sequence of fingerprints to be verified according to the fingerprints and the pressing intensities of the N pressing operations.

8. The method according to claim 1, further comprising:
detecting whether a number of the N pressing operations is the same as a number of pressing operations performed for generating the reference sequence of fingerprints;

when the number of the N pressing operations is different from the number of pressing operations performed for generating the reference sequence of fingerprints, determining that the fingerprint of the user is failed to be verified; and when the number of the N pressing operations is the same as the number of pressing operations performed for generating the reference sequence of fingerprints, triggering the step of generating the sequence of fingerprints to be verified according to the fingerprints and the pressing intensities of the N pressing operations.

9. A device for verifying a fingerprint, comprising:
a processor; and
a memory configured to store instructions executable by the processor,
wherein the processor is configured to:
acquire N pressing operations successively performed by a finger of a user within an area for acquiring the fingerprint, wherein N>1;
generate a sequence of fingerprints to be verified according to fingerprints and pressing intensities of the N pressing operations;
compare the sequence of fingerprints to be verified with a reference sequence of fingerprints; and
determine that the fingerprint of the user is successfully verified when the sequence of fingerprints to be verified is the same as the reference sequence of fingerprints, wherein the processor is further configured to:
classify operation types of the N pressing operations, wherein the pressing operations of which the pressing intensities exceed a preset threshold value belong to a first operation type and the pressing operations of which the pressing intensities do not exceed the preset threshold value belong to a second operation type;
sequence the operation types according to pressing moments of the corresponding N pressing operations to obtain a sequence of operations; and
generate the sequence of fingerprints to be verified according to the sequence of operations and the fingerprints.

10. The device according to claim 9, wherein the processor is further configured to:
after sequencing the operation types according to pressing moments of the corresponding N pressing operations, record a period of time for which each of the N pressing operations is performed to obtain the sequence of operations.

11. The device according to claim 10, wherein the processor is further configured to:
compare the sequence of operations with a sequence of operations corresponding to the reference sequence of fingerprints to determine whether they are the same, and compare the fingerprints and fingerprints corresponding to the reference sequence of fingerprints to determine whether they are the same; and
determine that the sequence of fingerprints to be verified is the same as the reference sequence of fingerprints when it is determined that the sequence of operations is the same as the sequence of operations corresponding to the reference sequence of fingerprints and the fingerprints are the same as the fingerprints corresponding to the reference sequence of fingerprints.

12. The device according to claim 10, wherein the processor is further configured to:
detect whether a number of the N pressing operations is the same as a number of pressing operations performed for generating the reference sequence of fingerprints;
when a result of the detection indicates that the number of the N pressing operations is different from the number of pressing operations performed for generating the reference sequence of fingerprints, determine that the fingerprint of the user is failed to be verified; and
when the result of the detection indicates that the number of the N pressing operations is the same as the number of pressing operations performed for generating the reference sequence of fingerprints, trigger the step of generating the sequence of fingerprints to be verified according to the fingerprints and the pressing intensities of the N pressing operations.

13. The device according to claim 9, wherein the processor is further configured to:
compare the sequence of operations with a sequence of operations corresponding to the reference sequence of fingerprints to determine whether they are the same, and compare the fingerprints and fingerprints corresponding to the reference sequence of fingerprints to determine whether they are the same; and
determine that the sequence of fingerprints to be verified is the same as the reference sequence of fingerprints when it is determined that the sequence of operations is the same as the sequence of operations corresponding to the reference sequence of fingerprints and the fingerprints are the same as the fingerprints corresponding to the reference sequence of fingerprints.

14. The device according to claim 13, wherein the processor is further configured to:
detect whether a number of the N pressing operations is the same as a number of pressing operations performed for generating the reference sequence of fingerprints;
when a result of the detection indicates that the number of the N pressing operations is different from the number of pressing operations performed for generating the reference sequence of fingerprints, determine that the fingerprint of the user is failed to be verified; and
when the result of the detection indicates that the number of the N pressing operations is the same as the number of pressing operations performed for generating the reference sequence of fingerprints, trigger the step of generating the sequence of fingerprints to be verified according to the fingerprints and the pressing intensities of the N pressing operations.

15. The device according to claim 9, wherein the processor is further configured to:
detect whether a number of the N pressing operations is the same as a number of pressing operations performed for generating the reference sequence of fingerprints;
when a result of the detection indicates that the number of the N pressing operations is different from the number of pressing operations performed for generating the reference sequence of fingerprints, determine that the fingerprint of the user is failed to be verified; and
when the result of the detection indicates that the number of the N pressing operations is the same as the number of pressing operations performed for generating the reference sequence of fingerprints, trigger the step of generating the sequence of fingerprints to be verified according to the fingerprints and the pressing intensities of the N pressing operations.

16. The device according to claim 9, wherein the processor is further configured to:
detect whether a number of the N pressing operations is the same as a number of pressing operations performed for generating the reference sequence of fingerprints;
when a result of the detection indicates that the number of the N pressing operations is different from the number of pressing operations performed for generating the reference sequence of fingerprints, determine that the fingerprint of the user is failed to be verified; and
when the result of the detection indicates that the number of the N pressing operations is the same as the number of pressing operations performed for generating the reference sequence of fingerprints, trigger the step of generating the sequence of fingerprints to be verified according to the fingerprints and the pressing intensities of the N pressing operations.

17. A non-transitory computer-readable storage medium having stored therein instructions that, when executed by a processor of a mobile terminal, cause the mobile terminal to perform:
acquiring N pressing operations successively performed by a finger of a user within an area for acquiring a fingerprint, wherein N>1;
generating a sequence of fingerprints to be verified according to fingerprints and pressing intensities of the N pressing operations;
comparing the sequence of fingerprints to be verified with a reference sequence of fingerprints; and determining that the fingerprint of the user is successfully verified when the sequence of fingerprints to be verified is the same as the reference sequence of fingerprints, wherein generating the sequence of fingerprints to be verified according to the fingerprints and the pressing intensities of the N pressing operations further comprises:

classifying operation types of the N pressing operations, wherein the pressing operations of which the pressing intensities exceed a preset threshold value belong to a first operation type and the pressing operations of which the pressing intensities do not exceed the preset threshold value belong to a second operation type;

sequencing the operation types according to pressing moments of the corresponding N pressing operations to obtain a sequence of operations; and generating the sequence of fingerprints to be verified according to the sequence of operations and the fingerprints.

* * * * *